(12) United States Patent
Sharma et al.

(10) Patent No.: US 6,877,111 B2
(45) Date of Patent: Apr. 5, 2005

(54) METHOD AND APPARATUS FOR MANAGING REPLICATED AND MIGRATION CAPABLE SESSION STATE FOR A JAVA PLATFORM

(75) Inventors: Rahul Sharma, San Jose, CA (US); Vladimir Matena, Redwood City, CA (US); Masood Mortazavi, Cupertino, CA (US); Sanjeev Krishnan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 09/818,214

(22) Filed: Mar. 26, 2001

(65) Prior Publication Data

US 2002/0152422 A1 Oct. 17, 2002

(51) Int. Cl.[7] .............................................. G06F 11/00
(52) U.S. Cl. ................................ 714/13; 714/6; 714/15
(58) Field of Search ................................ 714/6, 13, 15, 714/19, 20

(56) References Cited

U.S. PATENT DOCUMENTS 6,182,086 B1    1/2001  Lomet et al.
6,421,739 B1 *  7/2002  Holiday ....................... 709/330

OTHER PUBLICATIONS

Little et al., "Maintaining Information about Persistent Replicated Objects in a Distributed System," Proceedings of the International Conference on Distributed Computing Systems. Pittsburgh, PA, May 25–28, 1993 and IEEE Comp. Soc. Press, U.S., vol. CONF. 13, May 25, 1993, pp. 491–498.

Oracle Corporation, "Oracle 9i Application Server," Nov. 2000, Retrieved from the Internet: <http://technet.oracle.com/products/ias/pdf/9ias_102.pdf>.

Sailil Deshpande, "Clustering: Transparent Replication, Load Balancing, and Failover," Jan. 2000, Retrieved from the Internet: <http://bdn.borland.com/article/images/26438/11501_r1.pdf>.

Silva et al., "Fault–Tolerant Execution of Mobile Agents," Dependable Systems and Networks, 2000. DSN 2000. Proceedings International Conference on New York, NY, USA Jun. 25–28, 2000, IEEE Comput. Soc., US, Jun. 25, 2000 pp. 135–143.

* cited by examiner

Primary Examiner—Scott Baderman
Assistant Examiner—Joshua Lohn
(74) Attorney, Agent, or Firm—Martine, Penilla & Gencarella, LLP

(57) ABSTRACT

An invention is disclosed managing the replicated and migration capable state for an enterprise Java bean (EJB) application. The invention includes executing a Java application on a server that includes an entity bean. In addition, a replicated state manager is executed that includes program instructions for managing an in-memory state of the Java application, and program instructions for replicating the in-memory state of the Java application to a replicated state server. The replicated state server can be a memory replicated state server, or a disk replicated state server. To facilitate application state management, embodiments of the present invention store states of the entity beans objects using state objects, which are updated in response to changes in the state of the application. Hence, the embodiments of the present invention define a logical separation between the application and the state objects.

29 Claims, 11 Drawing Sheets

METHOD AND APPARATUS FOR MANAGING REPLICATED AND MIGRATION CAPABLE SESSION STATE FOR A JAVA PLATFORM

CROSS REFERENCE TO RELATED APPLICATIONS

This application is related to (1) U.S. patent application Ser. No. 09/812,536, filed Mar. 19, 2001, and "Method and Apparatus for Providing Application Specific Strategies to a Java Platform including Start and Stop Policies," and (2) U.S. patent application Ser. No. 09/812,537, filed Mar. 19, 2001, and entitled "Method and Apparatus for Providing Application Specific Strategies to a Java Platform including Load Balancing Policies." Each of these related application is incorporated herein be reference.

BACKGROUND OF THE INVENTION

1. Field of the Invention

This invention relates generally to Java programming, and more particularly to methods for managing replicated and migration state in a Java environment.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks that must be performed by an application programmer, including memory management and cross-platform porting. In this manner, the Java programmer can better focus on design and functionality issues.

One particular Java environment is the Java 2 platform, Enterprise Edition (J2EE), which facilitates building Web-based and enterprise applications. Broadly speaking, J2EE services are performed in the middle tier between the user's browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. One aspect of the J2EE specification is the EJB 2.0 Container Managed Persistence (CMP). The EJB 2.0 specification defines a contract between an entity bean, its container and the persistence manager for the management of persistent state and relationships for the entity beans. For a complete specification of CMP, refer to the EJB 2.0 specification published by Sun Microsystems, Inc., which is incorporated by reference herein in its entirety.

According to the EJB programming model, a bean provider develops a set of entity beans for an application and specifies the relationships between these objects. For each entity bean, the bean provider specifies an abstract persistence schema, which defines a set of methods for accessing the container-managed fields and relationships for the entity bean. The container-managed fields and relationships of the abstract persistence schema are specified in the deployment descriptor defined by the bean provider.

The deployer uses the persistence manager provider tools to determine how persistent fields and relationships are mapped to the underlying persistence mechanism, such as, a database. The persistence manager tools also generate the additional classes and interfaces that enable the persistence manager to manage the persistent fields and relationships of the entity beans at the runtime. An advantage of container managed persistence is that the entity beans become logically independent of the underlying persistence mechanism. The CMP also leads to a simple programming mode for managing persistence.

An entity bean with container manager persistence includes its class, a remote or local interface that defines its client-view business methods, a home interface that defines create, remove, home and finder methods. The abstract persistence schema comprises a set of properties, each representing a field or relationship in the persistent state of entity bean. The entity bean defines a set of accessor (setter and getters) methods for the persistent fields and relationships.

The bean provider generally does not write any database access calls in the entity bean class. Instead, a persistence manager that is available to the container at runtime handles the persistence. The bean provider codes all persistent data access using the setter and getter methods defined for the container-managed persistent and relationship fields.

FIG. 1 is a diagram showing the tradeoffs that business and carrier grade applications have to make. The carrier grade applications, which are applications used in high-performance, high-traffic networks such as used by telecoms, service providers and ISPs, require higher performance and availability than business applications.

Carrier grade (CG) applications require high availability of the order of five 9's and better. A high availability environment is one in which a service or component has greater availability, usually due to component redundancy, than in some base environment. Typically the term is used to describe failover cluster environment in which a service is provided by a primary component, until after some failure, after which the secondary component takes over the provision of the service. The high availability requirement for carrier grade applications leads to a requirement for a carrier grade application to achieve prompt (two seconds or less) restart or failover to a secondary component with minimal disruption of service. Thus, the application has to become operational within minimal time after a failure.

A carrier grade application requires a shorter failover time as compared to the business applications, which typically store persistent state in a database to achieve ACID (Atomicity, Consistency, Isolation, Durability) properties for the managed state. Business applications rely on database-specific mechanisms to achieve state replication, thereby protecting persistent data from the failure of the primary database.

A typical database replication mechanism is database log replay. The database logs changes in a transaction log that is used for transaction replay in case of a failure. The log replay involves applying the transaction log to a replica database so that a near-mirror copy of primary database is created. Unfortunately, the time-delay in replaying the transaction log on the replica database slows down the failover. Moreover, a huge rate of inserts/updates may create huge transaction replay log, which further slows the transaction replay at the failure time.

Business applications also rely on parallel database servers to achieve state replication and failover. In case of parallel database servers, multiple active database engines, coordinated by a distributed lock manager, manage active replication. However, use of the distributed lock manager for coordinating database operations slows down the application performance. Hence, the use of a parallel database server is considered more suitable for read-only and read-mostly applications. With the short failover time requirement, a typical carrier grade application cannot rely on a database-based replication mechanism or a parallel database server to achieve state replication and failover.

Business applications typically need to maintain ACID properties for the data being used by the application. Such applications cannot afford any data inconsistency and thereby store persistent data in a database and use transactions. For business applications, the tradeoff between consistency and concurrency gets reflected in the choice of the database isolation level. The use of optimistic concurrency model as against pessimistic concurrency model is another design decision involved in the business applications as part of the consistency and concurrency tradeoff. Business applications also need a reliable and consistent database failover and recovery—these applications cannot afford any inconsistent data.

The carrier grade applications may have consistency and concurrency requirements that differ from the business applications. A carrier grade application may process multiple concurrent state transitions and may not require full ACID properties to be maintained for its managed state. For example, a CG J2EE application may need a fast failover and may afford to have the replica (now the new primary) take over in a state that is temporally inconsistent with the initial primary. The client using the carrier grade application should be able to bring the new primary into a consistent state by retrying transactions for state transitions.

In view of the forgoing, there is a need for systems and methods that manage state for applications that require high availability. The systems and methods should allow for state replication and provide high availability of the order of five 9's and better to carrier grade applications.

SUMMARY OF THE INVENTION

Broadly speaking, the present invention fills these needs by providing a subsystem that manages the replicated and migration capable state for an enterprise Java bean (EJB) application. In one embodiment, a method for managing replicated state for a Java platform is disclosed. The method includes executing a Java application having an entity bean on a server. In addition, a replicated state manager is executed that includes program instructions for managing an in-memory state of the Java application, and program instructions for replicating the in-memory state of the Java application to a replicated state server. The replicated state server can be a memory replicated state server, or a disk replicated state server. To facilitate application state management, embodiments of the present invention store states of the entity beans using state objects, which are updated in response to changes in the state of the application. Hence, the embodiments of the present invention define a logical separation between the application and the state objects.

In another embodiment, a system is disclosed that manages replicated state for a Java platform. The system includes an application part having an entity bean object, and a managed state part having a state object, wherein the state object stores a state of the entity bean object. In addition, a replicated state server is included that stores the state object, which is updated in response to changes in the state of the application. The replicated state server can be a memory replicated state server, or a disk replicated state server. Thus, a logical separation is defined between the application part and the managed state part.

Another system for managing replicated state for a Java platform is disclosed in a further embodiment of the present invention. The system includes an application part having an entity bean object and a related entity bean object. In addition, a managed state part is included that includes a first state object and second state object. The first state object stores a state of the entity bean object, and the second state object stores a state of the related entity bean object. Further, a replicated state server stores the first and second state objects, which are updated in response to changes in the state of the application. As in other embodiments of the present invention, the replicated state server can be a memory replicated state server, or a disk replicated state server. Further, the application part can include abstract entity bean object classes that are implemented during pre-deployment.

Advantageously, the embodiments of the present invention manage the state of entity beans using an in-memory state management facility, which allows state replication both in memory and on disk. As a result, applications executing on the Java system of the embodiments of the present invention can, in some embodiments, achieve continuous availability, on the order of about 99.9999% uptime or better. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for systems and methods that provide state management to applications requiring high availability. To this end, embodiments of the present invention provide a subsystem that manages the replicated and migration capable state for an Enterprise Java Bean (EJB) application. The subsystem of the embodiments of the present invention is capable of replicating the application state to memory-based and disk-based state servers. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
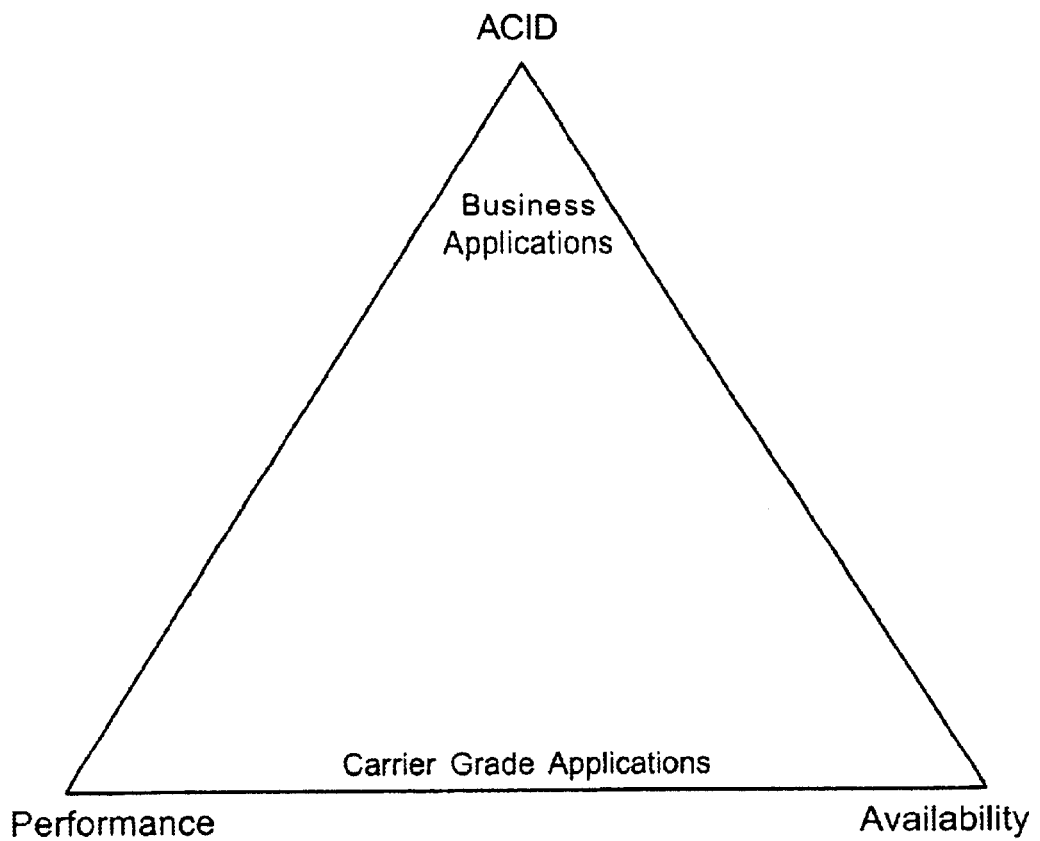
FIG. 1 is a diagram showing the tradeoffs that business and carrier grade applications have to make.
Figure 2:
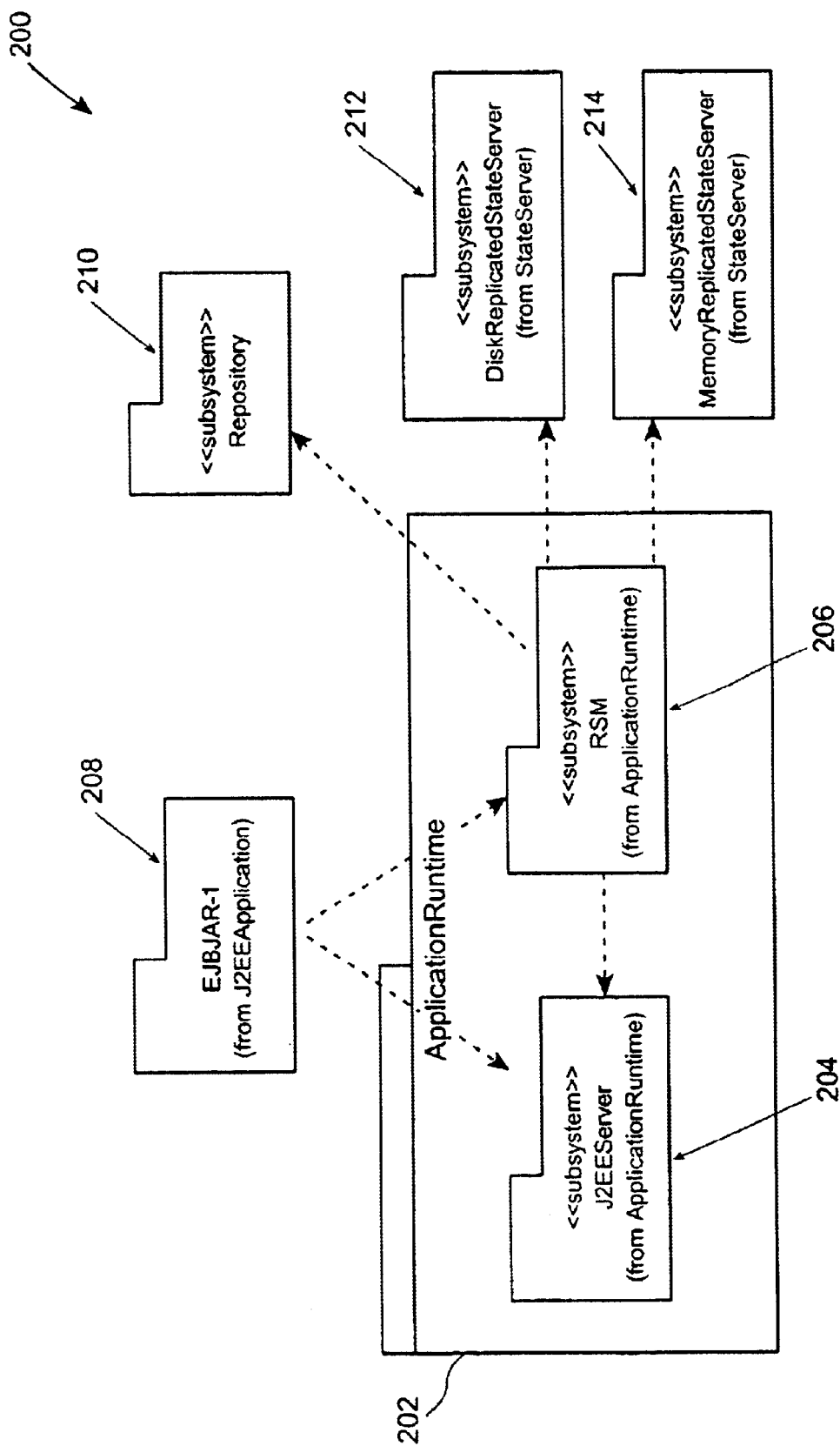
FIG. 2 is a Java system having state management, in accordance with an embodiment of the present invention.

FIG. 1 has been described in terms of the prior art. FIG. 2 is a Java system 200 having state management, in accordance with an embodiment of the present invention. The Java system 200 includes an application runtime subsystem 202 having a Java 2 Enterprise Edition (J2EE) Server 204 and a replicated state manager (RSM) subsystem 206. Also included in the Java system 200 are a Java application 208, a repository subsystem 210, a disk replicated state server subsystem 212, and a memory replicated state server subsystem 214.

FIG. 2 shows the RSM 206 interfacing with the (J2EE) Server 204, the Java application 208, the repository 210, the disk replicated state server subsystem 212, and the memory replicated state server subsystem 214. The J2EE Server subsystem 204 provides the runtime environment for J2EE applications, and includes implementations of different types of J2EE containers, such as an application client container, an EJB container, and a web container.

The Repository subsystem 210 stores and manages the software load for the J2EE application 208 and J2EE server 204. During pre-deployment of a J2EE application 208, classes and a deployment descriptor provided by an application developer are loaded into the repository 210, and later, loaded on to a J2EE server 204 to make the application 208 operational.

State server subsystems store and manage the replicated state for the J2EE application 208, which makes an application highly available. During application runtime, the RSM 206 replicates the replicated state to a state server. If the application 208 running on the J2EE server 204 fails, the application 208 restarts after failure by recovering its state from the replicated state server. The Java system 200 provides two types of state servers, a memory replicated state server 214 and a disk replicated state server 212. The memory replicated state server 214 stores the replicated state in an in-memory database, while disk replicated state server 212 uses a disk-based database to store and manage the replicated state.

As shown in FIG. 2, the RSM subsystem 206 is part of the J2EE Application Runtime subsystem 202, which is responsible for management and supervision of running the J2EE application 208. The RSM 206 manages the replicated and migration capable state for J2EE applications 208 that are running on a J2EE server 204. By managing application state, the RSM 204 provides support for online application upgrades, failure recovery and load balancing features of the J2EE system 200. The RSM 206 uses a memory database within a J2EE server process 204 to manage the application state. In this manner, the RSM enables an application to remain operational even if the state servers become temporary unavailable.

Figure 3:
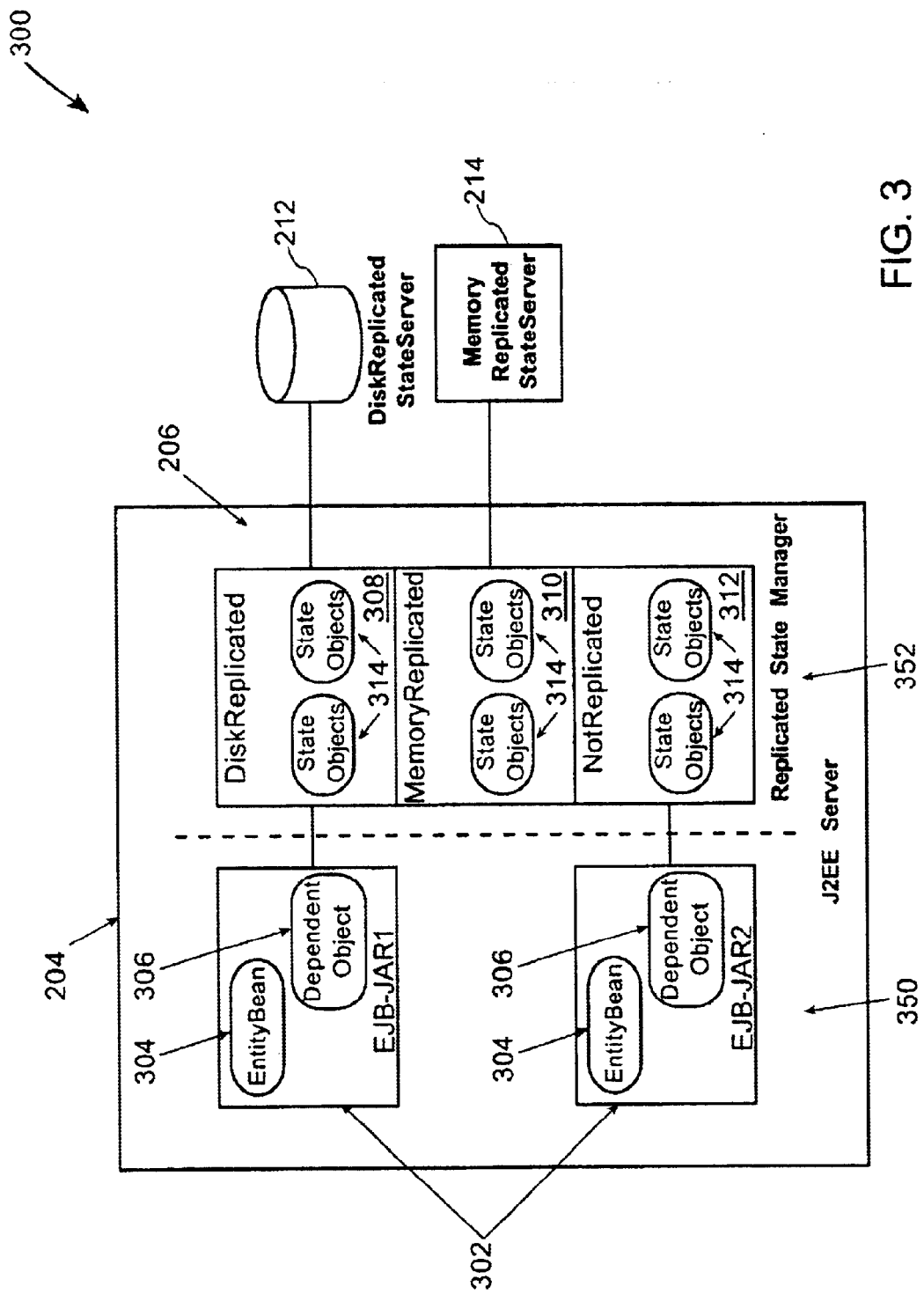
FIG. 3 is a block diagram showing replicated state subsystems, in accordance with an embodiment of the present invention.

FIG. 3 is a block diagram showing replicated state subsystems 300, in accordance with an embodiment of the present invention. The replicated state subsystems 300 show a J2EE server 204 in communication with a disk replicated state server 212, and a memory replicated state server 214. Based on the CMP model, the application developer develops a set of entity beans 304 for an application and specifies the relationships between these objects. For each entity bean 304, the application developer specifies an abstract schema 304 that defines a set of methods for accessing the container-managed fields and relationships for the entity bean. These container-managed fields and relationships are specified in the deployment descriptor defined by the application developer.

Each entity bean 304 includes an abstract class, a local and/or remote interface that defines bean's client-view business methods, a home interface that defines create, remove, home and finder methods. The abstract schema includes a set of properties, with each property representing a field or relationship in the container-managed state of the entity bean 304. The entity bean 304 also defines a set of setter and getters methods for the container-managed fields and relationships. The application developer codes state access and modifications using the setter and getter methods defined for the container-managed fields and relationships.

The EJB 2.0 CMP specification sets forth, without specific implementations, goals for a persistence manager that provides management of persistent state and relationships for the entity beans 304. The embodiments of the present invention provide specific methods for state management that achieve the goals set forth by the EJB 2.0 CMP specification. Specifically, the RSM of the embodiments of the present invention is a carrier-grade J2EE specific implementation of a persistence manager facility.

However, instead of mapping an abstract schema to a database-based persistence mechanism, RSM manages the state of entity beans 304 using an in-memory state management facility. This in-memory state manager runs within a J2EE server process. To support state recovery during an application restart and migration, the RSM actively replicates the in-memory state to disk replicated state servers 212 and/or memory replicated state servers 214.

FIG. 3 shows two EJB modules 302 deployed on a J2EE server process 204. Each EJB module 302 includes a set of entity beans 304. The RSM defines a separation between the application part 350 and managed state part 352.

The application part 350 includes abstract entity bean object classes 304 provided by application developer, based on the EJB 2.0 CMP model. The application part 350 also includes concrete implementation classes generated by the RSM. Further, the application part 350 provides the implementation of methods that provide the state transition logic for a J2EE application.

The Managed state part 352 includes the state objects 314 that capture the state of entity beans 304. The separation of state between application part 350 and managed state part 352 enables the RSM to support both application upgrade and migration.

The RSM of the embodiments of the present invention can generate concrete implementation classes for entity beans 304. The concrete classes generated by the RSM are responsible for managing the recoverable state of the entity beans 304. The RSM also provides implementation of collection classes that are used in managing container-managed relationships. By providing implementation of the getter and setter methods of the corresponding abstract classes, the RSM can implement the entity bean 304 classes. The RSM can also manage the mapping between primary keys and EJB objects, and can store the recoverable references to the remote and home interfaces of other EJBs.

The RSM further manages the relationships between entity beans 304. This includes maintaining the referential integrity of the container-managed relationships in accordance with the semantics of the relationship type.

The RSM manages the recoverable state of entity bean 304 based on the type of the state. Depending on the type of state, the RSM replicates the state in either a disk replicated state server 212 or a memory replicated state server 214. In addition, the RSM makes application state capable of migration from one J2EE server process 204 to another J2EE server process.

As will be discussed in greater detail below, the RSM supports checkpoints of the recoverable state to the two types of state servers, namely, the disk replicated state server 212 and the memory replicated state server 214. This includes support for connecting to the servers, sending checkpoints, recovering replicated state and merging the recovered state into existing in-memory state. Further, the RSM recovers the replicated state from the state servers during application restart after a failure or shutdown or during migration of EJB module from one J2EE server process to another.

During pre-deployment of an EJB module 302, the RSM maps the abstract schema of entity beans 304 classes to a physical schema used by the RSM. To perform this form of schema mapping, the RSM can use a deployment descriptor of EJB components. The RSM generates concrete implementations for the entity bean 304 classes defined as abstract classes by the application developer. A concrete implementation class includes the code that implements the setter and getter methods for container-managed fields and relationships based on the RSM mechanism.

Figure 4:
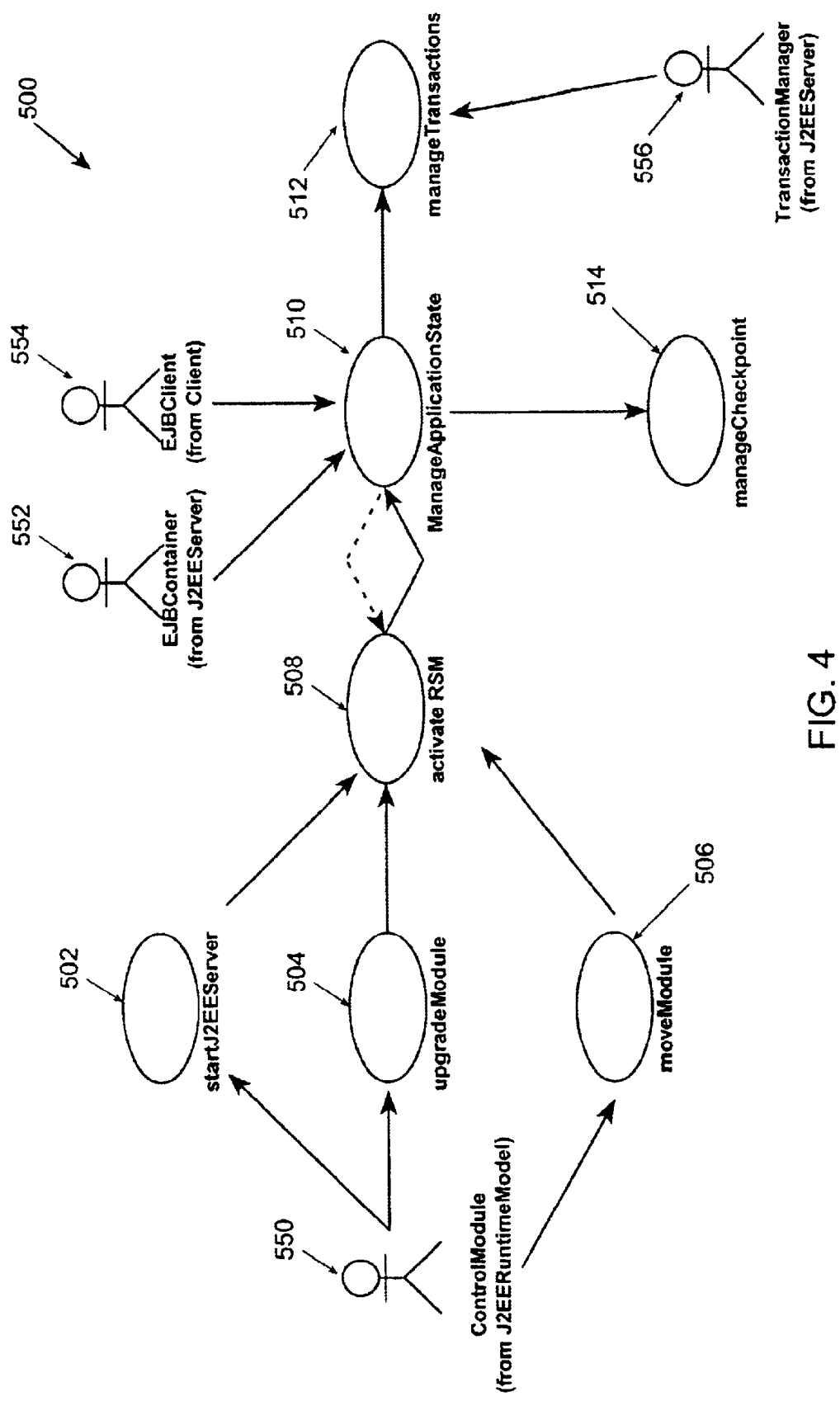
FIG. 4 is an illustration showing a hierarchy of use operations for an RSM, in accordance with an embodiment of the present invention.

FIG. 4 is an illustration showing a hierarchy of use cases 500 for an RSM, in accordance with an embodiment of the present invention. During application runtime, a Control Module 550, an EJB Container 552, a Transaction Manager 556, and an EJB Client 554 are the actors that drive use cases for the RSM.

The control module 550 is a part of a Java application that provides control and application-specific policies for the application. The control module 550 is described in greater detail in related U.S. patent application Ser. No. 09/812,536, filed Mar. 19, 2001, and entitled "Method and Apparatus for Providing Application Specific Strategies to a Java Platform including Start and Stop Policies," which is incorporated by reference in its entirety. The control module 550 is responsible for supervising the J2EE server 204 and the EJB modules at application runtime. Since the RSM is part of application runtime for a J2EE server process 204, J2EE server 204 activates the RSM as part of the start J2EE server process 502, the upgrade module process 504, and the move module process 506. The control module 550 interacts with the J2EE server 204, which in turn chives uses cases for RSM.

The EJB client 554 invokes a method on an entity bean that has its state managed by the RSM using a manage application state process 510. Such method invocation generally happens under a transaction, and drives the RSM to manage any changes to the entity bean's state as part of the invocation. The EJB container 552, which is part of J2EE server 204, intercepts the method invocation to inject its services, for example, the container 552 can start a transaction that brackets a method invocation. After injecting its services, the container 552 dispatches method invocation to the target entity bean instance. The EJB container 552 interfaces with the RSM to drive the manage transactions use case 512, the manage application state use case 510, and the manage checkpoints use case 514. Finally, the transaction Manager 556 manages transactions for the RSM, which acts as a transactional resource manager.

The RSM uses the manage application state use case 510 to manage state for an EJB-based application. The RSM acts as a carrier-grade implementation of the persistence manager facility defined in the EJB 2.0 specification. CMP model uses the RSM to manage replicated and migration-capable state for entity bean.

Initially, the EJB client 554 makes an invocation on a method defined as part of the remote or local interface of the target entity bean. Typically, a method invocation maps to a state transition implemented by the entity bean. Based on the CG J2EE programming model, a method invocation on an entity bean can be either local or distributed, synchronous or asynchronous, but preferably does not have any affect on how the RSM manages state for an invoked entity bean instance.

The EJB container 552 then intercepts the method invocation from the EJB client. The EJB container 552 uses this interception to inject container-specific services, such as, transaction bracketing and security mapping. As part of the method implementation, abstract entity bean classes provided by the application developer invoke setter and getter methods for container-managed fields and relationships. A concrete implementation class is then generated by the RSM and implements the setter and getter methods. This enables the RSM to manage the state of container-managed fields and relationships as part of its implementation. The RSM manages the state of entity beans using an in-memory state management facility, which runs within a J2EE server process.

When an entity bean undergoes state transitions initiated by a client application, the application changes the state objects. Any changes to the managed state part are tracked by the RSM. Depending on the state management requirements specified for a J2EE application, the RSM replicates the state objects to disk replicated and memory replicated state servers.

The RSM uses the manage checkpoint process 514 to manage checkpoints of replicated state, and then issues checkpoints to the state servers. More specifically, the RSM implements a checkpoint mechanism that is configurable using a checkpoint policy, which can be specified by the application Control Module 550. The RSM then uses the checkpoint mechanism to replicate state to the disk replicated state server and the memory replicated state server.

The RSM can issue checkpoints at different points, such as at the successful commit of each transaction. Generally, no checkpoint is issued for a transaction that fails to commit and is rolled back. This ensures that the state is replicated to state servers for only committed transactions leading to consistent recovery after failure, migration or shutdown. The RSM can optimize the checkpoint mechanism by combining transactions from successful commits of multiple transactions, and maintaining a sequence of box-carried checkpoints. This is referred to as boxcarring of checkpoints for multiple transactions.

Further, the checkpoint can be issued either synchronously or asynchronously. The synchronous checkpointing increases the reliability associated with the checkpointing mechanism. The state server ensures that checkpoints propagated to it are processed, thereby avoiding any potential loss of checkpoints. The replicated state in the state servers stays identical with the in memory state managed by RSM, ensuring a faster recovery during the failover.

In the asynchronous checkpoint mechanism, the RSM on the J2EE server process can enqueue checkpoints on a local message queue, thus the checkpoint messages are placed in the local address space before getting dispatched. The checkpoint operation returns immediately after the enqueuing operation allowing the on-going transaction to complete.

The message queue takes the responsibility of delivering the checkpoint messages to the state server at some time later after the transaction has been successfully committed. Preferably, the message queue preserves the ordering of the checkpoint messages in the order that transactions were executed on the application.

Asynchronous checkpointing adds more flexibility to the state replication mechanism. Based on the checkpointing policy, the message queue can take decision to propagate asynchronous checkpoints at different intervals—after each committed transaction, after a set of committed transactions or after a defined time interval.

Figure 5:
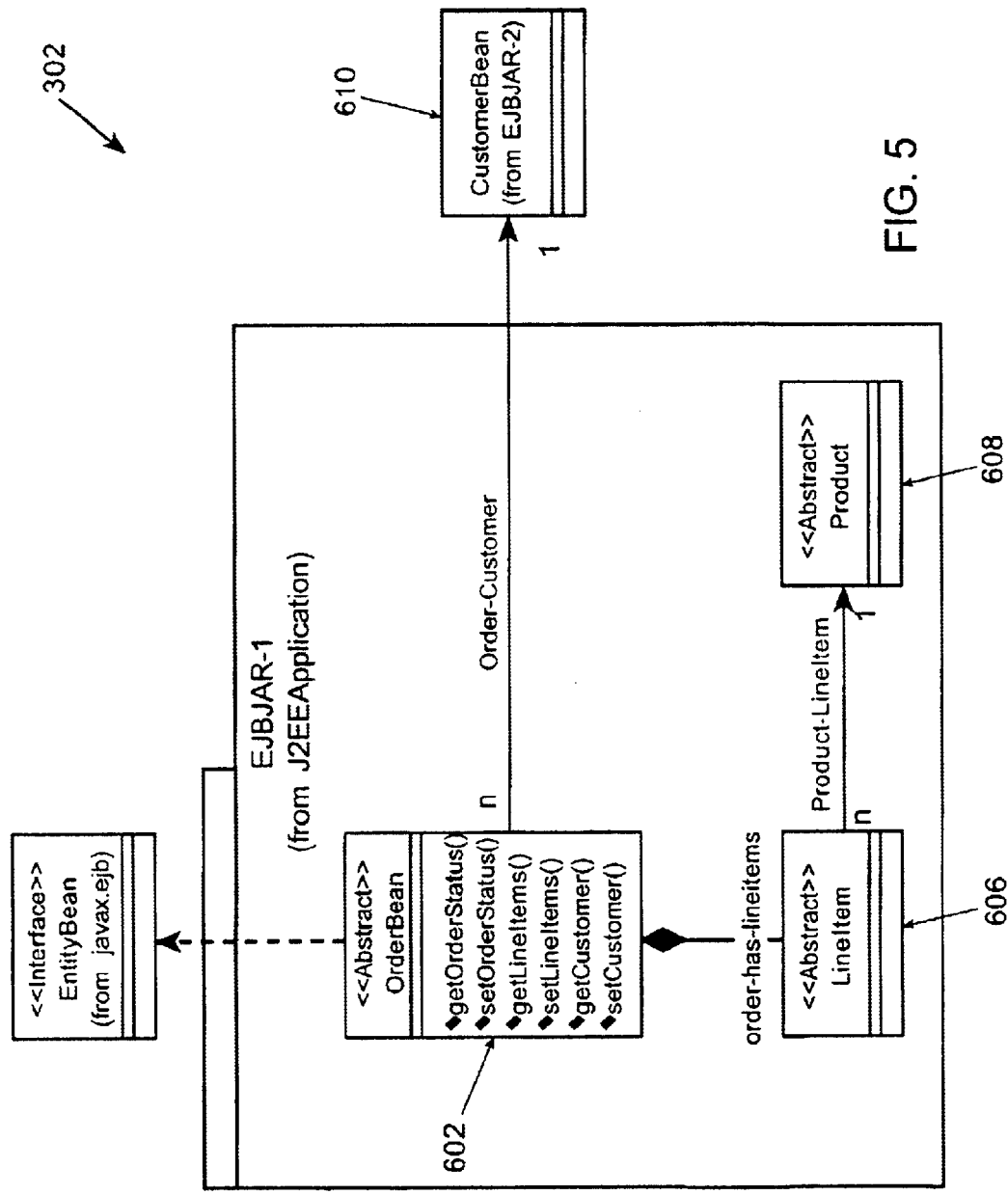
FIG. 5 is a class diagram showing an EJB module, in accordance with an embodiment of the present invention.

FIG. 5 is a class diagram showing an EJB module 302, in accordance with an embodiment of the present invention. The EJB module 302 includes three entity beans, namely, an order bean 602, a customer bean 610, a LineItem and a product bean 608. It should be noted that the customer bean 610 shown in FIG. 5 is actually from another EJB module.

As shown if FIG. 5, the order bean 602 entity bean class is defined to be an abstract class. The RSM generates the concrete implementation class for this abstract class. The order bean 602 includes setter and getter methods for the container managed persistent fields and container managed relationship fields.

Figure 6:
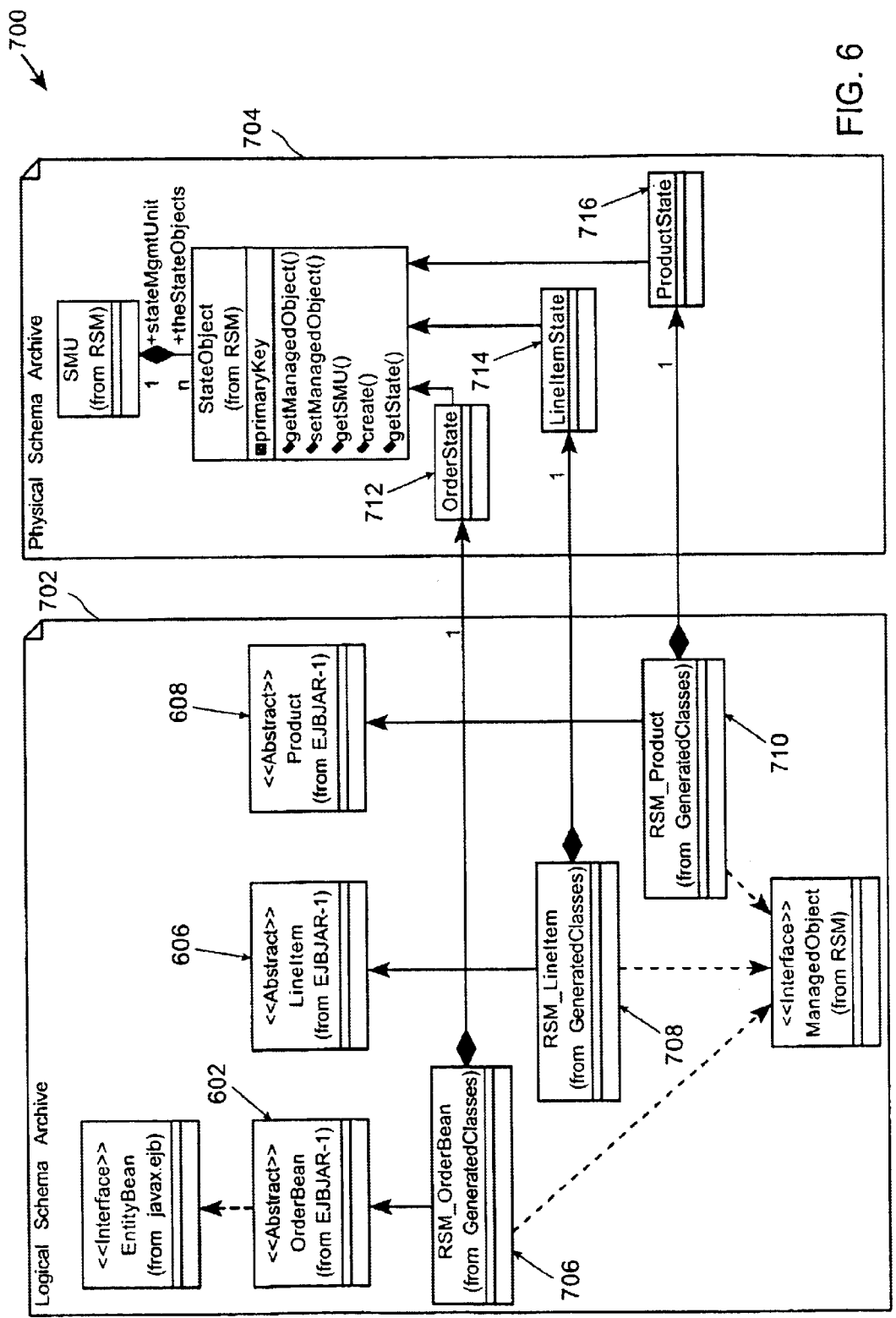
FIG. 6 is a class diagram showing RSM generated classes, in accordance with an embodiment of the present invention.

FIG. 6 is a class diagram showing RSM generated classes 700, in accordance with an embodiment of the present invention. The RSM generated classes include a RSM_OrderBean 706, a RSM_LineItem 708, and a RSM_Product 710, which are all concrete implementation classes generated by the RSM. These concrete classes, together with abstract classes, Order Bean 602, LineItem 606, and Product 608, are packaged as part of the logical schema archive 702 in the repository. During application runtime, the RSM loads these classes and creates entity bean object instances.

The Order State 712, Line Item State 714, and Product State 716 are state object classes generated by the RSM. These classes are maintained as part of physical schema archive 704. The RSM loads these classes as managed state part of a running application.

Figure 7:
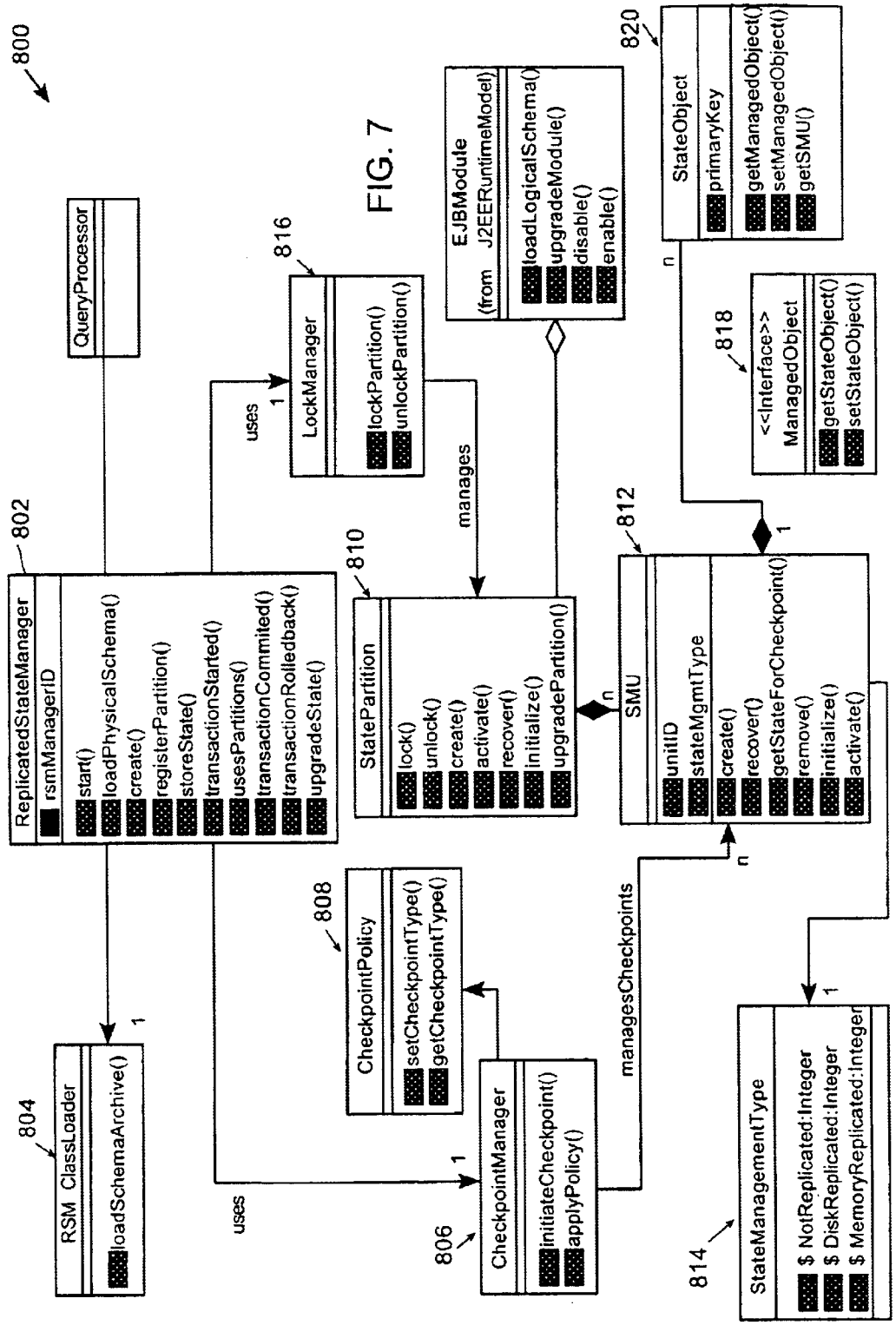
FIG. 7 is a class diagram showing classes and interfaces defined as part of the RSM, in accordance with an embodiment of the present invention.

FIG. 7 is a class diagram showing classes and interfaces 800 defined as part of the RSM, in accordance with an embodiment of the present invention. The classes and interfaces 800 include a replicated state manager 802, a RSM class loader 804, a checkpoint manager 806, a checkpoint policy 808, a state partition 810, a state management unit (SMU) 812, a state management type 814, a lock manager 816, a managed object 818, and a state object 820.

In operation, the replicated state manager 802 takes the overall responsibility for managing mechanisms and policies of RSM. A single instance of the replicated state manager 802 is created per EJB server process. The RSM class loader 804 is responsible for loading classes packaged as part of physical schema archive 702. The checkpoint manager 806 manages the checkpoint mechanism for the RSM. Based on the checkpoint policy 808, the checkpoint manager 806 makes a decision as to whether a checkpoint should be issued for managed state at successful commit of each transaction or whether multiple checkpoints can be boxcarried.

The checkpoint policy 808 defines policies for the checkpoint mechanism. Checkpoint policy 808 includes policy concerning whether a checkpoint is initiated per successful transaction commit verses box carrying, and synchronous verses asynchronous checkpointing. The checkpoint policy 808 also manages the lock release relative to the checkpoints.

The state partition 810 defines the unit of concurrency for transactions active within the RSM. The state object 820 instances, described below, which are managed by the RSM, can be partitioned across multiple state partitions 810. The RSM uses a lock on a state partition 810 instance to allow only a single transaction to be active within a state partition 810 at any particular instance.

The SMU 812 represents a collection of state objects 820 managed by the RSM as a single unit. The SMU 812 keeps track of changes to its collection of state object 820 instances. Each SMU 812 has a defined type represented by state management type 814, described subsequently. The RSM manages SMUs 812 based on the SMU type. The state management type defines the type of an SMU, which can be: not replicated, disk replicated, or memory replicated. The state object 820 class is defined for each entity bean. The RSM uses instances of this class to manage state for entity beans.

The lock manager 816 manages locks on state partition 810 instances. The RSM uses the lock manager 816 to lock a state partition 810 so that only one transaction can be active within this partition. The managed object 818 represents the interface implemented by a generated concrete implementation class. The RSM generates concrete implementation classes for each abstract class defined for an entity bean.

Figure 8:
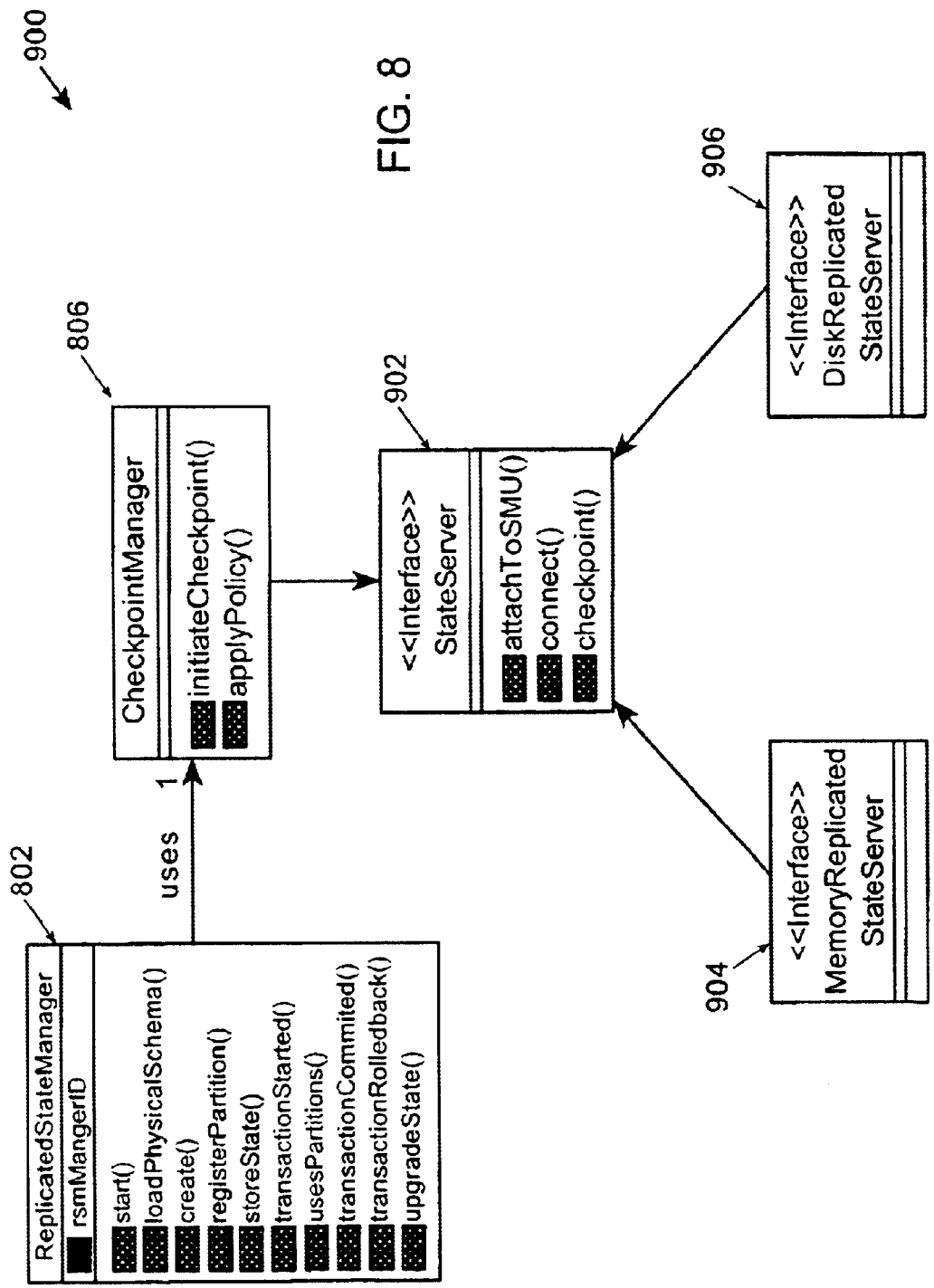
FIG. 8 is a class diagram showing state server interfaces used by the RSM, in accordance with an embodiment of the present invention.

FIG. 8 is a class diagram showing state server interfaces 900 used by the RSM, in accordance with an embodiment of the present invention. The RSM interfaces with two types of state servers for replicating recoverable state, a disk replicated state server 212 and memory replicated state server 214. Each of the two state servers runs in a separate process relative to the J2EE server process.

The state server interface 902 abstracts the underlying implementation details of the state server. The checkpoint manager 806 uses the state server interface 902 to remain independent of underlying implementation of a state server. The disk replicated state server interface 904 and memory replicated state server interface 906 extend the state server interface 902 to represent two types of state servers.

The state server 902 and its sub-interfaces are implemented as part of RSM implementation. The implementation of a state server interface 902 can be layered on top of a JDBC driver or resource adapter based on the type of state server. For example, a JDBC driver can be used for a disk replicated state server that uses a relational database for persistent state management. The replicated state manager 802 uses the checkpoint manager 806 instance to send checkpoints to the two state servers. The checkpoint manager 806 uses the type of a SMU to determine where to send checkpoint for a specific SMU.

Figure 9:
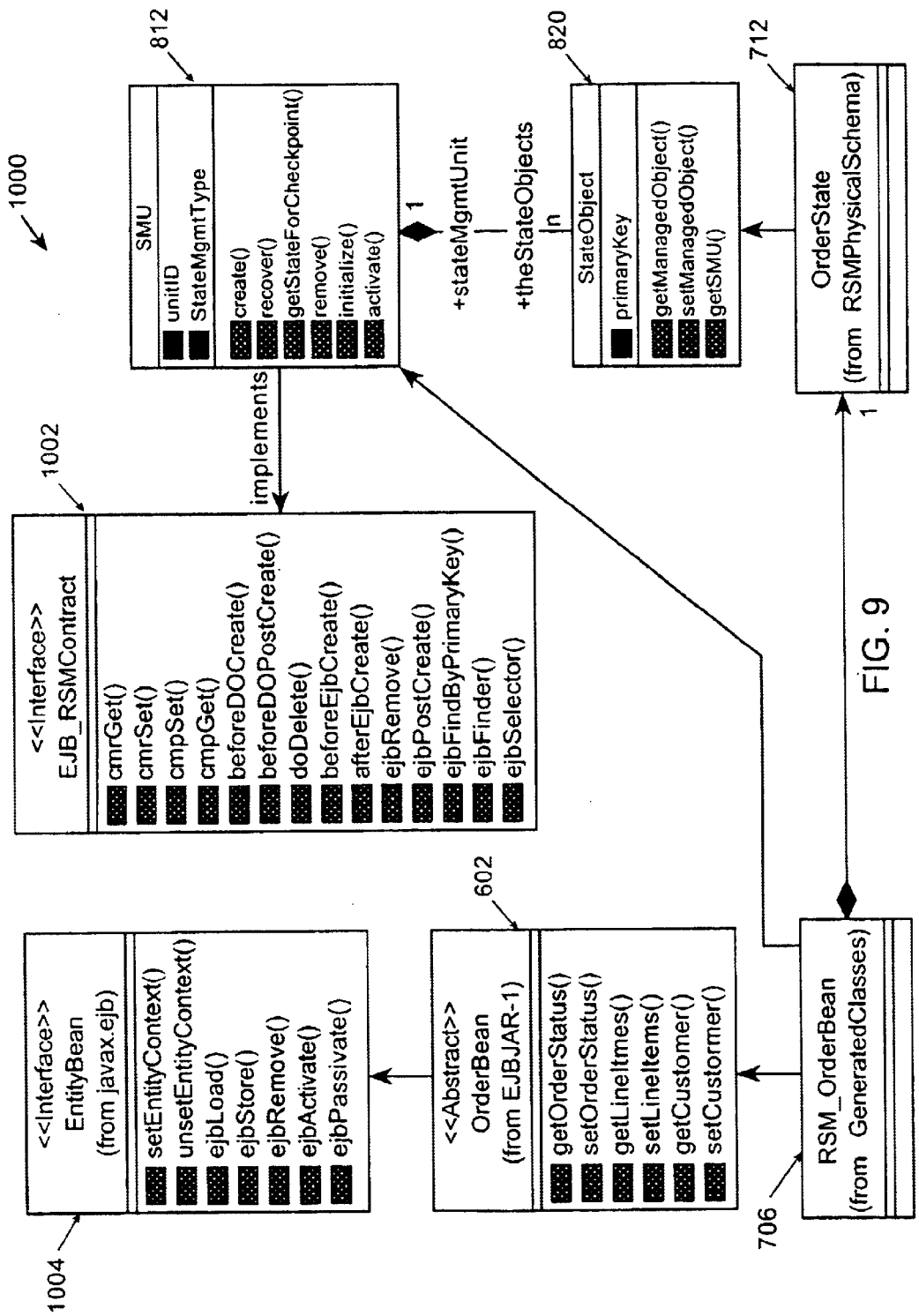
FIG. 9 is a class diagram showing internal contracts used by the RSM for state management, in accordance with an embodiment of the present invention.

FIG. 9 is a class diagram showing internal contracts 1000 used by the RSM for state management, in accordance with an embodiment of the present invention. FIG. 9 shows an order bean abstract 602, a RSM order bean 706, a state object 820, the SMU 812, and the EJB RSM contract 1002.

The order bean abstract entity bean class 602 is provided by the application developer. This class implements the methods defined in remote or local entity bean interface, but generally does not implement any setter and getter methods for container-managed fields and relationships. The RSM order bean 702 is a concrete implementation class generated by RSM. The RSM order bean 702 implements the setter and getter methods for container-managed fields and relationships. Implementations of these methods enable RSM to manage recoverable state for entity beans.

The state object base class 820 is used by the RSM to manage state objects for entity beans. As previously mentioned, the SMU 812 represents a collection of state object 820 that are managed by the RSM as a single unit. The SMU 812 keeps track of changes to its collection of state object 820 instances. The SMU 812 implements the EJB RSM Contract interface 1002 to keep track of state changes. The RSM concrete implementation class uses methods on the EJB RSM Contract interface 1002 to delegate state management and tracking to SMU 812.

Figure 10:
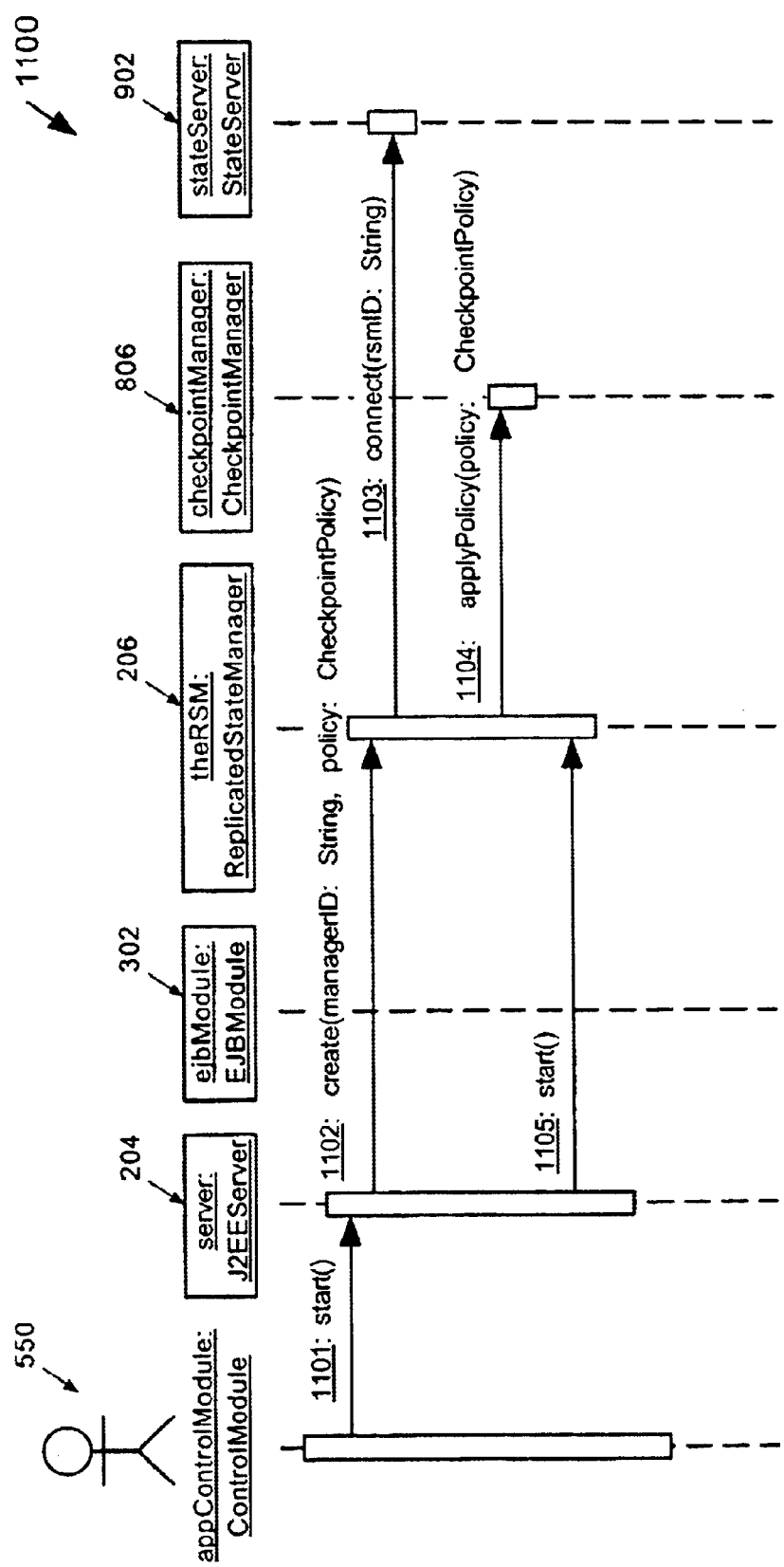
FIG. 10 is sequence diagram showing a RSM start sequence, in accordance with an embodiment of the present invention.

FIG. 10 is sequence diagram showing a RSM start sequence 1100, in accordance with an embodiment of the present invention. The RSM start sequence 1100 shows a method for initiating an RSM 206 of the embodiments of the present invention.

In operation 1101 the control module 550 for an application requests the J2EE server 204, on which the control module is running, to initiate the RSM for the application. The J2EE server 204 then creates the RSM 206 as part of the server startup, in operation 1102. In operation 1103, the RSM 206 connects to both memory replicated and disk replicated state servers. The RSM 206 uses the state server interface 902 to abstract details of how an underlying driver is used to connect to a state server. In operation 1104, the RSM 206 initializes its checkpoint mechanism using the checkpoint manager 806 based on the checkpoint policy provided by the application control module 550. Then, in operation 1105, the J2EE server 204 starts an initialized RSM 206.

Figure 11:
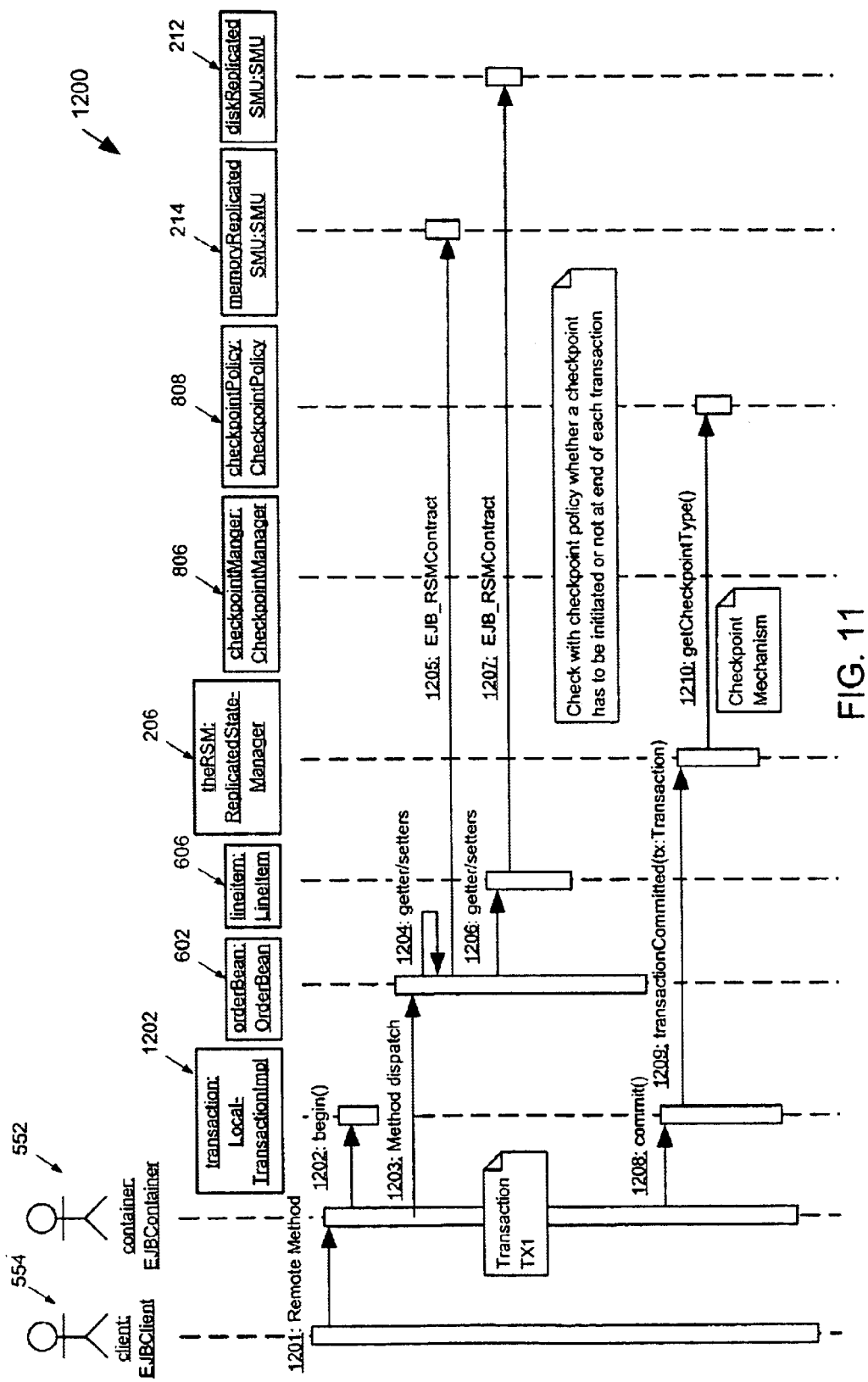
FIG. 11 is a sequence diagram showing an issue checkpoint sequence, in accordance with an embodiment of the present invention.

FIG. 11 is a sequence diagram showing an issue checkpoint sequence 1200, in accordance with an embodiment of the present invention. In operation 1201, the EJB client 554 invokes a method on the OrderBean. In response, the EJB container 552, which is part of the J2EE server process, brackets the method invocation in a container-managed transaction, in operation 1202. Next, in operation 1203, the EJB container 552 dispatches the method to the OrderBean class 602. The OrderBean 602 then undergoes state transition by invoking getter/setter methods on container-managed fields defined for OrderBean or other related entity beans, in operation 1204.

The RSM generated concrete implementation classes for an entity bean use the EJB_RSM contract to delegate replicated state management to RSM 206, in operations 1205–1207. The RSM 206 keeps track of state changes by using the SMU and StatePartition facilities. The RSM 206 also associates these state changes to the undergoing transaction.

The then EJB container 552 initiates a commit of the transaction at the end of method invocation, in operation 1208, and informs the RSM 206 about initiation of transaction commit, in operation 1209. The RSM uses transactionCommitted notification to initiate a checkpoint of state changes that happened on RSM-managed state during this transaction, in operation 1210. The RSM uses the checkpoint policy to determine how checkpoint mechanism is managed.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing replicated and migration capable session state for a Java application, comprising the operations of:

executing a Java application on a server, the Java application including multiple entity beans;

executing a replicated state manager, wherein the replicated state manager includes program instructions for managing a replicated and migration capable session state of the Java application using an in-memory database within a Java server process, and wherein the replicated state manager further includes program instructions for replicating an in-memory state of the Java application to a replicated state server; and updating and tracking changes for checkpoint mechanism to state objects in response to changes in the state of the application, the replicated state in the replicated state server staying substantially identical to the in-memory state managed by the replicated state manager.

2. A method as recited in claim 1, wherein the replicated state server is a memory replicated state server.

3. A method as recited in claim 1, wherein the replicated state server is a disk replicated state server.

4. A method as recited in claim 1, further comprising the operation of using state replication to different types of state servers to achieve high availability for the Java application.

5. A method as recited in claim 4, further comprising the operation of recovering state from the state servers during application failure.

6. A method as recited in claim 5, further comprising the operation of configuring checkpoints using checkpoint policy.

7. A method as recited in claim 1, further comprising the operation of storing a state of the entity bean using the state object.

8. A method as recited in claim 7, wherein the state object is an in-memory object managed by the replicated state manager with a J2EE server process.

9. A method as recited in claim 8, further comprising the operation of defining a logical separation between the application and the state objects.

10. A system for managing replicated state for a Java platform, comprising:

an application part having an entity bean object;

a managed state part having a state object, wherein the state object stores a state of the entity bean object within a memory address space of a J2EE server process; and a replicated state server that stores a replica of the state object;

wherein a replicated state in the replicated state server stays substantially identical to an in-memory state managed by a replicated state manager, the replicated state manager tracking updates to the state object in response to changes in the state of the entity bean object.

11. A system as recited in claim 10, wherein the replicated state server is a memory replicated state server.

12. A system as recited in claim 10, wherein the replicated state server is a disk replicated state server.

13. A system as recited in claim 10, wherein a logical separation is defined between the application part and the managed state part.

14. A system for managing replicated state for a Java platform, comprising:

an application part having an entity bean object and a related entity bean object;

a managed state part having a first state object and second state object, wherein the first state object stores a state of the entity bean object, and wherein the second state object stores a state of the related entity bean object, and wherein the managed state part maintains a relationship between the entity bean object and the related entity bean object; and a replicated state server that stores a replica of the first state object and a replica of the second state object, wherein a replicated state in the replicated state server stays substantially identical to an in-memory state managed by a replicated state manager, the replicated state manager tracking updates to the state objects for issuing checkpoints in response to changes in the state of the entity bean object and the related entity bean object.

15. A system as recited in claim 14, wherein the replicated state server is a memory replicated state server.

16. A system as recited in claim 14, wherein the replicated state server is a disk replicated state server.

17. A system as recited in claim 14, wherein a logical separation is defined between the application part and the managed state part.

18. A system as recited in claim 14, wherein the application part maps to a logical schema archive, and wherein the managed state part maps to a physical schema archive.

19. A system as recited in claim 18, wherein the logical schema archive and the physical schema archive are created in a repository during pre-deployment.

20. A system as recited in claim 19, wherein the replicated state manager uses the logical schema archive and the physical schema archive at runtime to create the application part and the managed state part with a J2EE server process.

21. A system as recited in claim 20, wherein an architecture of the replicated state server can be used to plug in a high-performance database server for managing replicated state.

22. A system as recited in claim 21, wherein the replicated state manager is capable of performing as a transactional resource manager using an in-memory state manager, whereby high throughput is achieved for transactions.

23. A system as recited in claim 22, wherein the replicated state manager uses a transaction model to manage the checkpoints of the replicated state.

24. A system as recited in claim 23, the managed state part allows a transaction to proceed when state servers are temporarily unavailable.

25. A system as recited in claim 14, further including a configurable checkpoint mechanism that is configured using a checkpoint policy.

26. A system as recited in claim 25, wherein the checkpoint mechanism is configured to be synchronous.

27. A system as recited in claim 25, wherein the checkpoint mechanism is configured to be asynchronous.

28. A system as recited in claim 25, wherein the checkpoint mechanism is configured to be boxcarried.

29. A system as recited in claim 25, wherein the checkpoint mechanism is configured to be single transaction.

* * * * *